P. JOHNSON.
WHIFFLETREE HOOK.
APPLICATION FILED FEB. 16, 1912.

1,061,545.

Patented May 13, 1913.

WITNESSES:
A. E. Carlsen.
E. C. Carlsen.

INVENTOR:
Pauline Johnson.
BY her ATTORNEY:
A. M. Carlsen.

COLUMBIA PLANOGRAPH CO., WASHINGTON, D. C.

UNITED STATES PATENT OFFICE.

PAULINE JOHNSON, OF BROCKTON, MONTANA.

WHIFFLETREE-HOOK.

1,061,545.　　　　Specification of Letters Patent.　　Patented May 13, 1913.

Application filed February 16, 1912. Serial No. 678,097.

*To all whom it may concern:*

Be it known that I, PAULINE JOHNSON, a citizen of the United States, residing at Brockton, in the county of Valley and State of Montana, have invented a new and useful Whiffletree-Hook, of which the following is a specification.

My invention relates to whiffle-tree-hooks; and the object is to provide a safe, durable and easily operated whiffle-tree-hook or device for attaching a tug to the end of a whiffle-tree.

Figure 3:
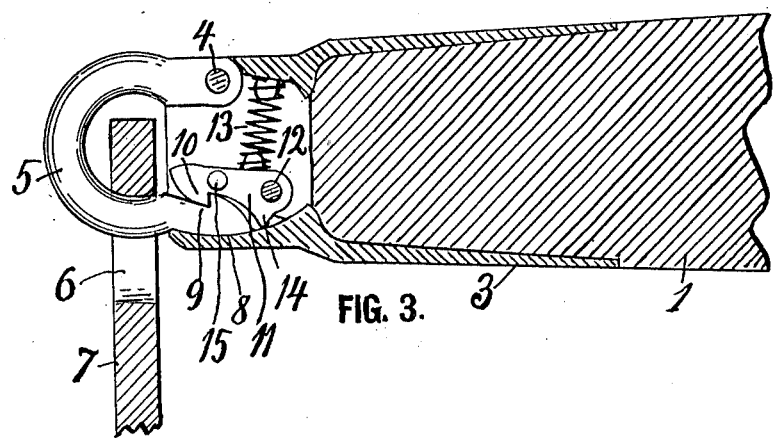
Figure 2:
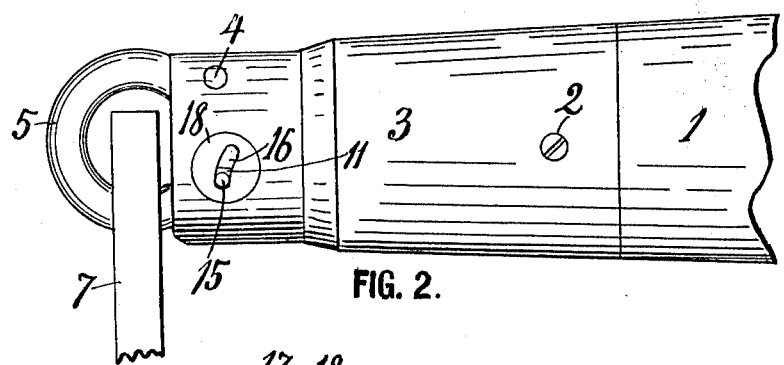
Figure 1:
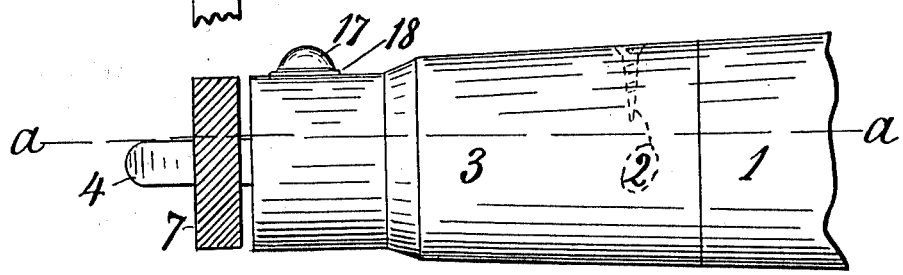

In the accompanying drawing,—Figure 1 is a front elevation of a portion of a whiffle-tree provided with my improved hook and a tug engaged by the hook. Fig. 2 is a top view of what is shown in Fig. 1 with a press-button 17 removed. Fig. 3 is a section on the line *a—a* Fig. 1.

Referring to the drawing by reference numerals, 1 designates a portion of a wooden whiffle-tree upon which is secured by a screw 2 a ferrule or sleeve 3, in whose outer end is pivoted at 4 a hook 5 adapted to engage in the usual eye 6 of a tug 7; the point of the hook when closed bears against a segmental face 8 near the end of the sleeve and is provided with a notch 9 in which engages a tooth 10 of a dog 11, which is pivoted at 12 and by a spring 13 held in engagement with the hook 5. The dog is provided with a lug 14 which contacts with the sleeve and thereby limits the action of the spring and holds the dog in ready position for engagement. The dog also has a pin 15 extending outward through a slot 16 in the sleeve and is provided with a cap 17 serving as a press-button and also as a lid over the slot. To enable the lid to fit the sleeve and still be movable along its face, the latter is formed with a boss 18 that is plane at the top. When the tug is to be released the operator presses sidewise on the button 17 so as to disengage the dog from the notch 9, he then swings the hook 5 open and removes the tug from it, when the tug is to be hitched or attached again, the hook is simply passed through the eye 6 of the tug and pushed to the closed position shown in Fig. 3 and in which the spring-pressed dog automatically locks it and entirely prevents accidents of the kind frequently resulting from tugs being accidentally disengaged from whiffle-trees.

What I claim is:—

1. A whiffle-tree hook comprising a sleeve securable upon the end of a whiffle-tree and having in its outer end an open space, a U-shaped hook adapted to engage a tug by one of its arms and having its two ends or arms normally inserted in the space in longitudinal direction of the sleeve, one end being pivoted to the sleeve and the other provided with a notch, a spring-pressed dog pivoted in the space and arranged to engage in the notch and hold the hook closed, and means for reaching the dog to disengage it from the hook when so desired, said sleeve having a lateral slat, and said disengaging means consisting of a pin fixed in the dog and projecting outward through and beyond the slot.

2. A whiffle tree hook comprising a sleeve securable upon the end of a whiffle-tree and having in its outer end an open space, a U-shaped hook adapted to engage a tug and having its two ends or arms normally inserted in the space, one end being pivoted to the sleeve and the other provided with a notch, a spring-pressed dog pivoted in the space and arranged to engage in the notch and hold the hook closed, and means for reaching the dog to disengage it from the hook when so desired, the engagement of the tug being upon one arm of the hook and said arm being normally supported against the inner side of the sleeve to prevent spreading of the hook by the pulling of the tug.

In testimony whereof I affix my signature, in presence of two witnesses.

PAULINE JOHNSON.

Witnesses:
M. J. ANDERSON,
C. D. F. WAGNER.

Copies of this patent may be obtained for five cents each, by addressing the "Commissioner of Patents, Washington, D. C."